United States Patent [19]

Wampfler

[11] 4,220,229

[45] Sep. 2, 1980

[54] INSULATIVE SUPPORT FOR CONDUCTIVE RAIL ASSEMBLY

[75] Inventor: Manfred Wampfler, Weil, Fed. Rep. of Germany

[73] Assignee: Wampfler GmbH, Fed. Rep. of Germany

[21] Appl. No.: 908,882

[22] Filed: May 23, 1978

[30] Foreign Application Priority Data

Sep. 1, 1977 [DE] Fed. Rep. of Germany ....... 2739482

[51] Int. Cl.³ .................... B60M 1/18; B60M 1/34; B60M 1/24
[52] U.S. Cl. ................................. 191/39; 191/234; 191/44.1
[58] Field of Search ................... 191/39, 40, 42, 33 R, 191/23 A, 44.1

[56] References Cited

U.S. PATENT DOCUMENTS

| | | | |
|---|---|---|---|
| 2,835,752 | 5/1958 | Anjeskey et al. | 191/23 A |
| 2,918,540 | 12/1959 | Mayer | 191/23 A |
| 2,994,734 | 8/1961 | Scofield et al. | 191/23 A |
| 3,957,142 | 5/1976 | Devolle | 191/23 A |
| 4,016,961 | 4/1977 | Howell, Jr. | 191/23 A |

*Primary Examiner*—Stephen G. Kunin
*Assistant Examiner*—Edmond G. Rishell, Jr.
*Attorney, Agent, or Firm*—Pollock, Vande Sande & Priddy

[57] ABSTRACT

Support assembly for joining and insulating a plurality of electrically-charged rails adaptable for transmitting electrical current to a trolley or like vehicle and comprising an insulative member surrounding each of the conductive rails, with adjacent rails and corresponding insulative members being joined at spaced junction hoods for ensuring complete insulation of the rails at all operating temperatures.

16 Claims, 6 Drawing Figures

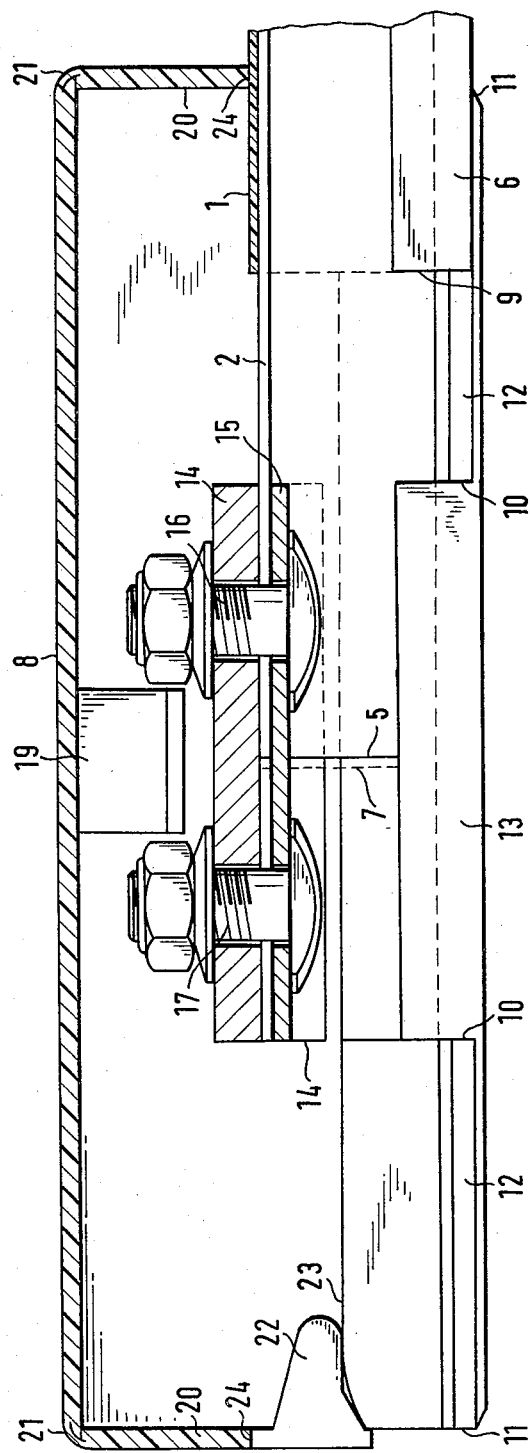

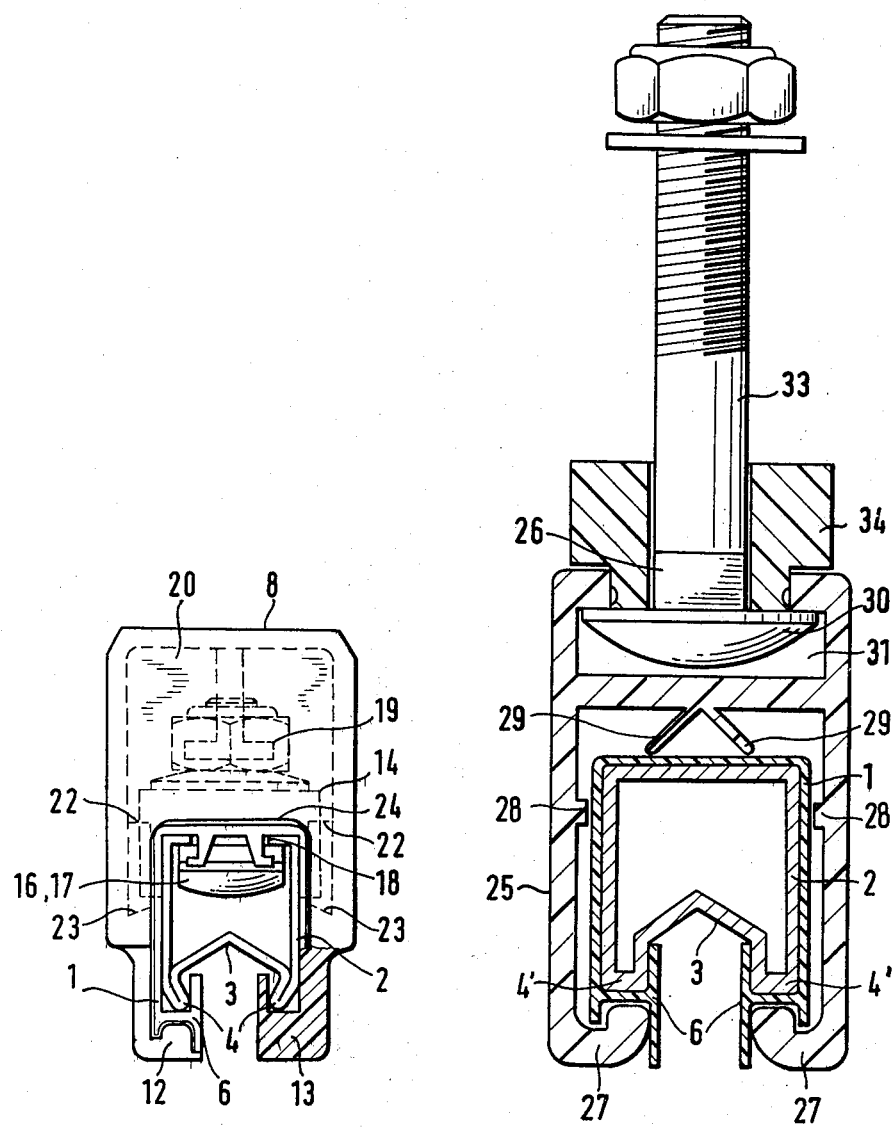

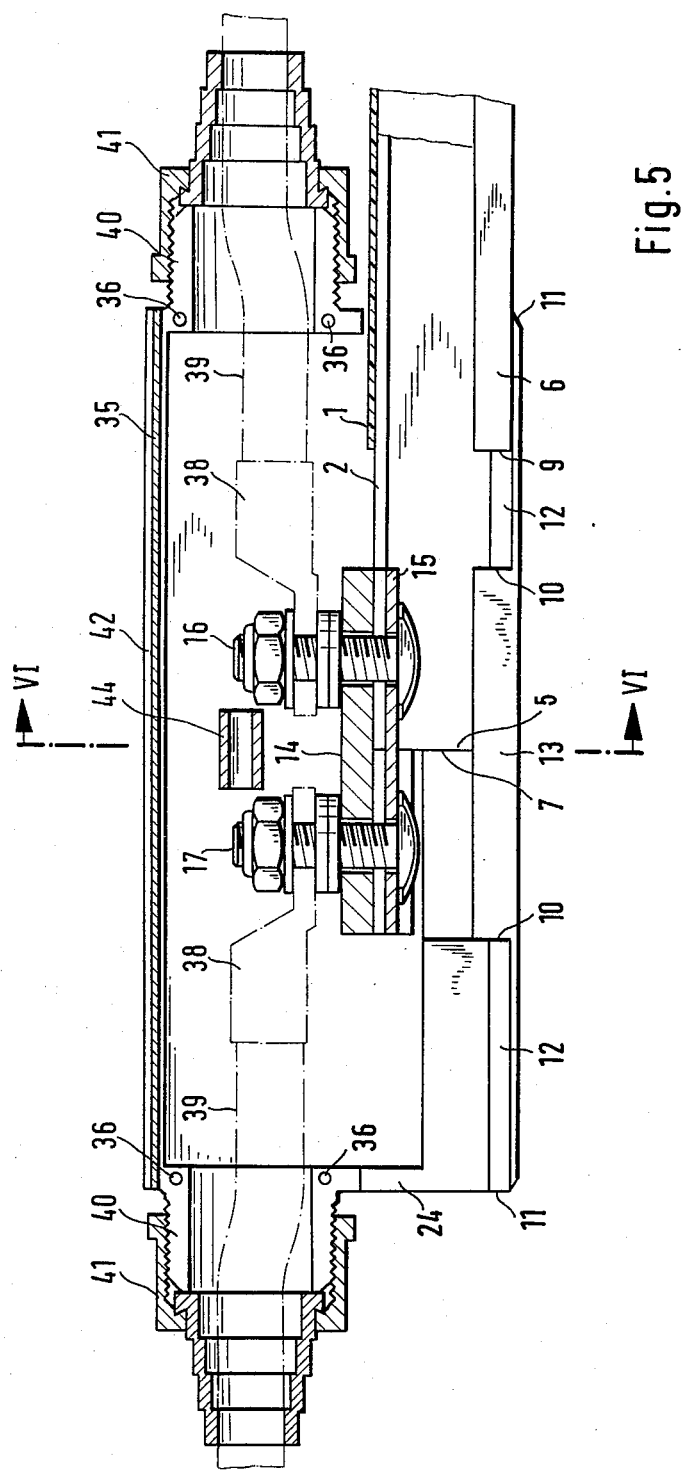

INSULATIVE SUPPORT FOR CONDUCTIVE RAIL ASSEMBLY

BACKGROUND OF THE PRESENT INVENTION

The present invention relates to an electrically-charged rail assembly adaptable for transmitting electrical current to a trolley or like vehicle. In particular, the present invention discloses an arrangement for insulating and supporting a conductive rail subject to thermal expansion and contraction during operation.

Known conductive rail assemblies usually comprise a plurality of metallic rail sections, joined to form a continuous, conductive rail assembly which may be suspended above and parallel to a pair of trolley tracks. It is further known to enclose an outer surface of the conducting rail with insulative material for safety purposes. Furthermore, junction hoods which enclose and join end portions of adjacent metallic rail sections are generally known.

A critical problem facing these known conductive rail assemblies is excessive thermal expansion and contraction of the individual rails and insulative material when subjected to temperatures ranging from $-30°$ C. to $+70°$ C. Because conductive rail sections are usually constructed of aluminum, steel or copper, they possess coefficients of expansion which are relatively lower than the synthetic insulating material which encloses the rails. For example, a 100 meter length of conductive rail will expand 235 mm if made of aluminum, 120 mm if made of steel and 165 mm if made of copper, while a corresponding length of insulation will expand 650 mm if made of polyvinyl chloride.

In known assemblies, a separate section of insulating material is used to enclose each rail section, with each insulating section being cut shorter than its corresponding rail section, to allow for increased relative thermal expansion. Ends of adjacent insulating sections as well as rail sections are rigidly attached to junction hoods during assembly. When the resulting rail assembly is subject to high operating temperatures, both the junction hoods and the attached insulating sections may be axially displaced by thermal expansion. When the temperature falls, the individual insulating sections each contract relative to the hoods and may actually pull out of engagement therewith, exposing the conductive rail and creating a safety hazard.

An additional disadvantage of known junction hood assemblies is a gradual spreading apart at the slot portion engaging the trolley, which increasingly exposes greater amounts of the conducting rail to human contact. A yet further disadvantage of known conducting rails resides in the bracket necessary for suspending the rail assembly above the trolley. Because known devices rigidly attach the suspension brackets to the conducting rail, thermal expansion may cause the rail to expand and buckle between adjacent brackets.

Another problem is the inability to properly align conductive rail sections rigidly attached to suspension brackets. Each of these problems becomes readily apparent along a curved portion of the rail assembly, wherein the rail sections tend to increase the radii of the track of the current-carrying rails which is opposed by the rigidly connected brackets. As a result, strong lateral forces are generated often resulting in premature failure of the brackets.

One attempt to overcome these problems has been the placement of expansion joints between the individual rail sections. However, expansion joints tend to interrupt the gliding track of the trolley, resulting in damage to the contact brush portion attached to the trolley. A further problem with expansion joints is the costly need for placing an electrical connection on either side of each expansion joint.

As will be discussed in detail hereafter, applicant's new and useful invention solves the problems confronting the prior art, while at the same time providing a conducting rail assembly which is completely insulated during all operating temperatures and which may be slidingly suspended above a trolley by a bracket assembly which ensures proper alignment under all operating conditions.

Objects and Summary of the Present Invention

An object of the present invention is to provide a conductive rail assembly which remains fully insulated during all temperatures encountered during operation.

A further object of the present invention is to join adjacent rail sections and correspondingly adjacent sections of insulation within a junction hood such that the length of the hood is greater than the expansion difference between the rail section and the insulation section within the range of operating temperatures, ensuring continuous insulation of the rail sections.

A further object of the present invention is to provide a unique, two-piece junction hood which can be easily assembled and inexpensively manufactured.

In a preferred embodiment of the present invention, a plurality of separate conductive rail assemblies are fixedly positioned within spaced, junction hoods. Adjacent end sections of metallic conductive rail are supported within a common junction hood. Separate sections of insulating material enclose each of the adjacent rail assemblies and extend into the appropriate junction hood. The junction hoods are uniquely shaped to retain support of both the rail and insulation sections during any relative thermal expansion which may take place. The junction hoods further include curved end sections for supporting the ends of the conductive rail to prevent accidental separation. The engaged rail sections are slidably supported from a plurality of novel suspension brackets spaced along the rail assembly.

A complete understanding of the present invention will become apparent from a reading of the following specification and claims, together with the accompanying drawings, wherein similar elements are referred to and are indicated by similar reference numerals.

BRIEF DESCRIPTION OF THE DRAWINGS

The present invention can be best understood with reference to the accompanying drawings, wherein:

FIG. 2 shows a cross-sectional view of a junction hood according to a preferred embodiment of the present invention.

FIG. 3 shows an end view of the junction hood assembly of FIG. 2, with a portion broken away to show the internal structure;

FIG. 4 shows a cross-sectional view of a suspension bracket according to a preferred embodiment;

FIG. 5 shows a cross-sectional view of a junction hood according to an alternative embodiment.

DETAILED DESCRIPTION OF A PREFERRED EMBODIMENT

Figure 1:
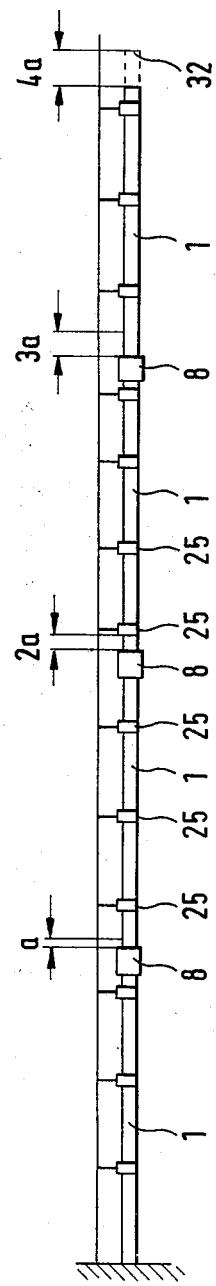
FIG. 1 shows a diagrammatic view of a conductive rail assembly according to the present invention.

Referring to the drawings, and FIG. 1 in particular, there is shown a side-view of a conductive rail assembly according to a preferred embodiment. A plurality of insulative sections 1 each enclose a corresponding plurality of separate rail sections attached to one another. The conductive rail assembly is supported by a plurality of insulative suspension brackets 25, which may be spaced approximately 1.5 meters apart. A plurality of junction hoods 8 support confronting ends of adjacent rails and also support end portions of adjacent insulative sections 1.

Each current-carrying rail section may be said to expand by an amount "a" as the temperature of the rail changes between −30° C. and +70° C. If the actual temperature change is of a lesser amount, the rails will expand by a proportionally lesser amount. As the temperature approaches +70° C., each rail section expands and a first junction hood 8 shifts to the right by the amount "a", a second junction hood 8 by the amount "2a", a third junction hood by the amount "3a", with an unattached end 32 of rail assembly shifting an amount "4a", as shown in FIG. 1. The amount of the expansion is solely determined by the type of metal used for the rail sections. The surrounding insulative sections 1 also expand within the region between adjacent junction hoods in a manner to be described in detail hereafter.

Turning now to FIGS. 2 and 3, a typical junction hood 8 will be described in detail. Each of the conducting rail sections is substantially box-shaped, with a gliding track portion 3, which is V-shaped for making contact with a conductive shoe of a trolley or like vehicle (not shown). Projections 4 are formed at either end of the V-shaped track portion and extend in a longitudinal direction, with an upper portion of the rail section 2 being open.

Insulative section 1 is generally U-shaped and encloses an outer surface portion of rail 2, leaving an open slot facing gliding track portion 3 to allow for entry of the conductive shoe. As better shown in FIG. 4, insulative section 1 includes a pair of generally H-shaped end sections 6 which are positioned to enclose and provide support for projections 4', with projections 4' functioning to stiffen the curved, substantially H-shaped end sections 6 for longer wear.

End surfaces 5 and 7 of adjacent rail sections 2 abut one another within junction hood 8. The current-conducting rail section 2 ending with end surface 5 is fully shown, while only end surface 7 of the remaining rail section 2 is shown for purposes of clarity. An end surface 9 of an insulative section 1 is positioned between edge surface 10 and end portion 11 of junction hood 8 with an increase in the ambient temperature causing expansion of insulative section 1, with end surface 9 approaching edge 10. In a similar manner, a decrease in the ambient temperature causes contraction of section 1, with end surface 9 approaching end portion 11.

Lower end surfaces 12 of junction hood 8 are curved into a general L-shape, with a portion of an end surface 12 engaging a portion of H-shaped end 6 of insulative section 1. This arrangement helps to prevent any spreading of rail 2 and insulative section 1 to limit accessibility thereto. A further end 13 of junction hood 8 is L-shaped between edge 10 and end 9, engaging a portion of rail projection 4 for additional support.

End surfaces 5 and 7 are forced into engagement by a U-shaped, metallic connecting piece 14 which abuts both of the rail sections 2. Along an inside portion of rail 2 is positioned a support member 15, wherein connecting piece 14 and support 15 are clamped together by a pair of bolts 16 and 17 which contact stem portions 18 formed on the open ends of rail sections 2. A projection 19 protrudes into the space between a pair of conventional nuts attached to bolts 16 and 17, respectively, to prevent any axial motion of hood 8 relative to the junction point formed by end surfaces 5 and 7.

A guide track portion of hood 8 extending between edge 10 and end 11 is formed to be slightly longer than the heat expansion difference between insulative section 1 and current conducting rail 2 over an ambient temperature range between −30° C. and +70° C. This ensures that end 9 of section 1 will always be supported by hood 8.

Junction hood 8 is closed off at either end by a pair of cappings 20 which are joined to the main body by integral hinge portions 21. Each capping 20 includes two projections 22 which rest in a closed state on separate pegs 23 located inside hood 8. Pegs 23 protrude into the path of projections 22 to lock cappings 20 in place as required, with the pegs 23 and the bottom of projections 22 being leveled for easier engagement.

Junction hood 8 surrounds end portions of adjacent rail sections 2, with cappings 20 jutting out and slipped over the junction point formed thereby. In the course of the slipping over motion, ends 12 and 13 of hood 8 are spread apart and then allowed to snap inwardly. Cappings 20 are then closed, causing hood 8 to move upwardly in FIG. 2, while end 12 engages the lower slot at the end of the insulative section 1 and end 13 embraces projection 4. Cappings 20 are each provided with a recess 24 matching the shape of the upper side of insulative section 1.

Turning to FIG. 4, a generally U-shaped suspension bracket 25 is shown in cross-section. Bracket 25 surrounds insulative section 1 and includes a pair of curved end portions 27 engageable with ends 6 of insulative section 1. Inner walls of bracket 25 are maintained at a distance from outer walls of insulative section 1 by a pair of laterally extending guide projections 28 attached to bracket 25 and contacting section 1.

A pair of spring elements 29 are connected to an inner surface of bracket 25 and contact an outer surface of section 1 to prevent accidental separation of end portions 27 and 6, respectively. Insulative section 1 is slidingly supported within bracket 25 by curved end portions 27, allowing for any necessary axial movement of section 1 due to thermal expansion or contraction. A pocket 31 is provided in bracket 25 to accomodate a head 30 of mounting bolt 33. A shank portion of bolt 33 carries a square head 26 and a spacer bush 34 which is internally square in shape for placement on the shank. Bush 34 is externally shaped as a hexagon to allow mounting bolt 33 to rotate together with bush 34 relative to bracket 25.

Suspension bracket 25 is installed from above insulative section 1, with the legs of bracket 25 spreading an appropriate distance during installation. To provide for easy assembly, the curved end portions 27 are rounded for engagement with ends 6.

Figure 6:
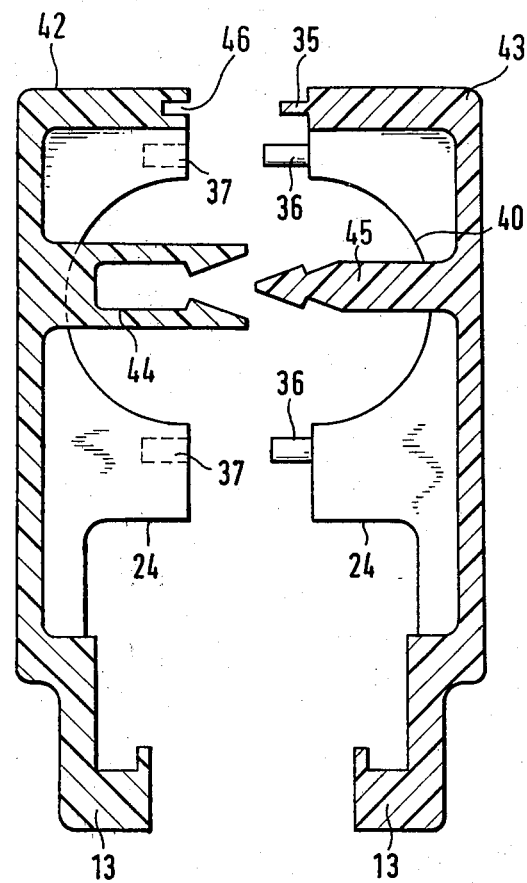
FIG. 6 shows a cross-section along a plane VI—VI of FIG. 5.

An alternative embodiment of a junction hood is shown in FIGS. 5 and 6, wherein the hood is formed from two, separate members 42 and 43 which are positioned laterally of the points of connection of rail sections 2. Hood member 42 includes a stop clip 44, while hood member 43 includes a catch pin 45, correspondingly positioned thereon. As members 42 and 43 are brought together, clip 44 and pin 45 interlock and enter the area between bolts 16 and 17, to prevent any axial movement of the hood assembly relative to the junction point.

Rim portions of members 42 and 43 may be provided with slot and spring connections 46 and 35 which provide a sealing engagement against water spray. Cover portions 20 of the preceeding embodiment may also be provided with the slot and spring connection described herein. Finally, guide pins 36 may be arranged to engage bores 37 to ensure a proper alignment of members 42 and 43.

Bolts 16 and 17 are connected to current terminals indicated at 38, with attached connecting cables 39 entering the junction hood by way of feed apertures 40. Apertures 40 are designed in the form of tubular fittings and are overlapped by cap nuts 41 to ensure the secure interlocking of members 42 and 43.

The present invention is not to be limited to the above-described embodiments, but should be limited only the the scope of the following claims.

What I claim is:

1. An assembly for joining and insulating a plurality of electrically-charged rail sections to provide electrical power to a trolley or the like and comprising:
   a plurality of insulative members each enclosing a surface portion of a separate rail section with each insulative member having an axial length which is less than an axial length of a respective rail section enclosed by said insulative member to allow for relative thermal expansion or contraction;
   a plurality of spaced, junction hood assemblies arranged for supporting end portions of adjacent rail sections and adjacent insulative members;
   wherein each of said junction hood assemblies is formed from a single piece and include opposed open end portions, each of which is closed by a capping member which is pivotally hinged to each of said junction hood assemblies and which is pivotable into said open end portion;
   each of said junction hood assemblies further including means for allowing movement of said insulative members while ensuring insulative coverage of portions of said rail sections extending between adjacent junction hood assemblies.

2. An assembly according to claim 1, wherein said insulative members are formed of synthetic material and are generally U-shaped in profile, with an open portion of said insulative member aligned with a track portion of said corresponding rail section to allow for electrical, gliding contact between said trolley and said track portion.

3. An assembly according to claim 2, wherein said rail sections are formed with projections extending from a pair of leg members attached on either side to said track portion;
   said insulative member including curved end portions for enclosing and supporting said projections to prevent separation of said legs while providing complete insulation.

4. An assembly according to claim 3, wherein said curved end portions are generally H-shaped in profile.

5. An assembly according to claim 1, wherein said junction hood assemblies are similarly shaped and each include a U-shaped, metallic connecting piece overlapping and abutting a first side of said rail sections and a separate support overlapping and abutting a second, opposite side of said rail sections,
   each of said junction hood assemblies further including a plurality of fasteners extending through apertures formed in said connecting piece and said support for drawing said metallic connecting piece and said support toward one another to provide a clamping force against said rail sections.

6. An assembly according to claim 5, wherein a projection is attached to each said junction hood assembly and extends between said fasteners for preventing axial movement of each said junction hood assembly relative to said fasteners.

7. An assembly according to claim 1, wherein each capping member is provided on opposite sides with a pair of projections;
   each of said projections abutting a peg formed in each of said junction hood assemblies to properly align said capping members.

8. An assembly according to claim 1, wherein said means comprises forming each of said junction hood assemblies with a pair of separate, curved leg sections which surround and slidingly support said adjacent insulative members.

9. An assembly according to claim 8, where portions of said curved leg sections support portions of said adjacent rail sections.

10. An assembly according to claim 8, wherein said curved leg, sections of each of said junction hood assemblies overlap end portions of adjacent insulative members by a distance which is greater than the heat expansion difference between said rail section and said insulative member within a temperature range experienced during operation.

11. An insulated, electrically-charged rail assembly capable of transmitting electrical current to a trolley or the like, and comprising:
   a plurality of adjacently disposed rail sections arranged in end-to-end relationship to one another, with a plurality of said rail sections each including at least one leg member having a projection extending outwardly therefrom;
   a plurality of adjacently disposed insulative sections, each partially enclosing a separate rail section, wherein each rail section is longer than its partially enclosing insulative section to allow for thermal expansion or contraction of each pair of adjacently disposed insulative sections;
   a separate junction hood assembly having opposite end portions overlapping a pair of said adjacently disposed rail sections as well as overlapping the insulative sections partially enclosing said pair of rail sections, with the opposite end portions of said junction hood assembly each including a curved leg portion and a confronting projection extending outwardly from each of said pair of rail sections; and
   substantially H-shaped engagement means mounted on each insulative section for slidably engaging said leg portion and said confronting projection to properly align said junction hood assembly relative to said rail section while allowing relative thermal expansion between said rail and insulative sections.

12. An assembly according to claim 11, wherein said separate junction hood assembly is formed of two members, one of said junction hood members including a female slot which retains a male projection attached to said remaining hood member.

13. An assembly according to claim 11, wherein said separate junction hood assembly includes at least one aperture extending therein for introducing current-carrying means into said junction hood assembly.

14. A rail assembly according to claim 11, wherein each rail section includes a pair of spaced leg members having a curved track section extending therebetween, wherein each leg member includes a projection extending outwardly therefrom.

15. A rail assembly according to claim 14, wherein each insulative section is formed of a synthetic material having a substantially U-shaped configuration.

16. A rail assembly according to claim 15, wherein separate H-shaped engagement means is attached to opposite ends of said U-shaped insulative member with each separate H-shaped engagement means positioned between the projection extending outwardly from said rail section and a curved leg portion of said junction hood assembly for slidably joining said insulative member to both that rail section and said junction hood assembly.

* * * * *